United States Patent
Serrano et al.

(10) Patent No.: US 10,349,268 B1
(45) Date of Patent: Jul. 9, 2019

(54) AUTOMATIC COMMUNICATION DEVICE ONBOARDING

(71) Applicant: MOTOROLA SOLUTIONS, INC., Chicago, IL (US)

(72) Inventors: Sebastian Serrano, Weston, FL (US); Derick J. Clack, Seattle, WA (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/979,211

(22) Filed: May 14, 2018

(51) Int. Cl.
*H04W 8/24* (2009.01)
*G06Q 30/06* (2012.01)

(52) U.S. Cl.
CPC ........ *H04W 8/245* (2013.01); *G06Q 30/0635* (2013.01)

(58) Field of Classification Search
CPC .......................... H04W 8/245; G06Q 30/0635
See application file for complete search history.

(56) References Cited

U.S. PATENT DOCUMENTS

| 2013/0140361 | A1* | 6/2013 | Ling | G06Q 20/3274 235/380 |
| 2014/0279324 | A1* | 9/2014 | King | G06Q 30/04 705/34 |
| 2018/0007037 | A1* | 1/2018 | Reese | H04L 63/0838 |
| 2018/0206117 | A1* | 7/2018 | Stahl | H04L 63/0823 |

\* cited by examiner

*Primary Examiner* — George Eng
*Assistant Examiner* — Hung K Du
(74) *Attorney, Agent, or Firm* — Michael Best & Friedrich LLP

(57) ABSTRACT

A method and system for preparing a portable communication device for onboarding to a service network. The system includes a provisioning server, a device management server, and a factory computer. The factory computer is configured to call the provisioning server with a message that includes at least one unique identifier of the portable communication device and a certificate signing request. The provisioning server is configured to store the at least one unique identifier, register, using the at least one unique identifier, the portable communication device with the device management server, and transmit, in response to the message from the factory computer, a signed certificate and an endpoint address to the factory computer.

10 Claims, 6 Drawing Sheets

AUTOMATIC COMMUNICATION DEVICE ONBOARDING

BACKGROUND OF THE INVENTION

Increasingly, agencies utilize portable communication devices, including, for example, smart phones and tablet computers. Such devices not only operate on many types of wireless voice and data communications networks, and may also be configured to access various network-attached databases and services. In order for the portable communication device to access such networks and services, an initial configuration process may be necessary.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
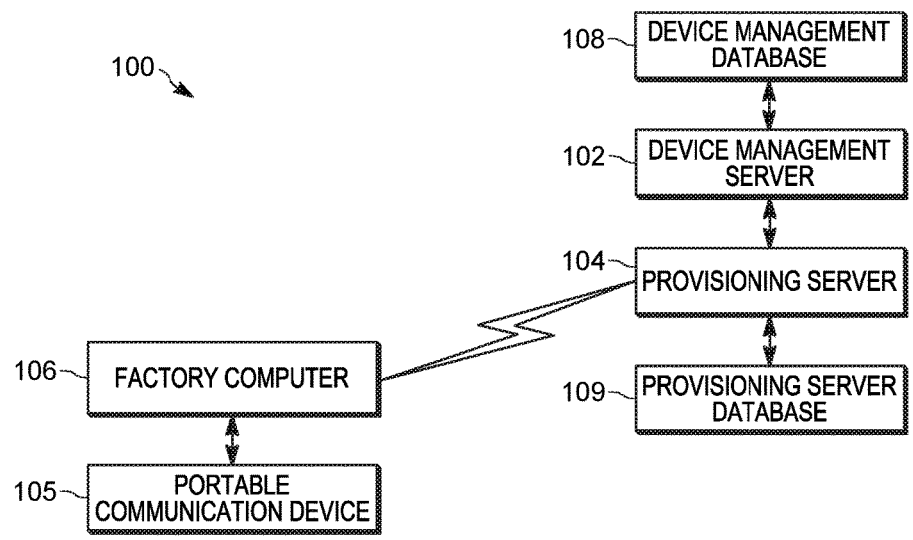
FIG. 1 is a block diagram of a system for preparing a portable communication device for onboarding to a service network in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

As noted, portable communication devices, including, for example, smart phones and tablet computers, operate on many types of wireless voice and data communications networks, including long term evolution (LTE), land mobile radio (LMR), 2G, 3G, 4G, and 5G, but may also be configured to access various databases and services. An initial configuration process may be necessary to enable the portable communication device to access such networks and services. However, these processes may be tedious, complex, prone to errors, and/or time-consuming for a user of the device to implement and may result in a poor out-of-box experience for the user.

Accordingly, systems and methods are provided herein for, among other things, a no-touch, automatic initial configuration process for a portable communication device performed at a manufacturing/factory facility.

One example embodiment provides a system for preparing a portable communication device for onboarding to a service network. The system includes a provisioning server, a device management server, and a factory computer. The factory computer is configured to call the provisioning server with a message that includes at least one unique identifier of the portable communication device and a certificate signing request. The provisioning server is configured to store the at least one unique identifier, register, using the at least one unique identifier, the portable communication device with the device management server, and transmit, in response to the message from the factory computer, a signed certificate and an endpoint address to the factory computer.

Another example embodiment provides a method for preparing a portable communication device for onboarding to a service network. The method includes receiving, at a provisioning server, a message from a factory computer the message including at least one unique identifier of the portable communication device and a certificate signing request. The method further includes storing at least one unique identifier of the portable communication device on a provisioning server, registering, using the at least one unique identifier, the portable communication device with a device management server, and transmitting to the factory computer, from the provisioning server, in response to the message from the factory computer, a signed certificate and an endpoint address.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

For ease of description, some or all of the example systems presented herein are illustrated with a single exemplar of each of its component parts. Some examples may not describe or illustrate all components of the systems. Other example embodiments may include more or fewer of each of the illustrated components, may combine some components, or may include additional or alternative components.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

For ease of description, some or all of the example systems presented herein are illustrated with a single exemplar of each of its component parts. Some examples may not describe or illustrate all components of the systems. Other example embodiments may include more or fewer of each of the illustrated components, may combine some components, or may include additional or alternative components.

FIG. 1 illustrates an exemplary system 100 for device onboarding. The system 100 includes a device management server 102, a provisioning server 104, a portable communication device 105, and a factory computer 106. It should be understood that the system 100 is provided as an example and, in some embodiments, the system 100 may include additional components. For example, the system 100 may include one or more databases including a device management database 108 and a provisioning server database 109. The system 100 also includes, in further embodiments, multiple device management servers 102, provisioning servers 104, multiple factory computers 106, multiple databases, or combinations thereof. It should also be understood that while only a single portable communication device 105 is illustrated, the system 100 may include more than one portable communication device 105. The related methods described herein may be applied to more than one portable communication device 105 concurrently.

In the illustrated embodiment, the portable communication device 105 is communicatively coupled to the factory computer 106. The factory computer 106 is communicatively coupled to the provisioning server 104, which is configured to communicate with the device management server 102. Each communication link may be wired or implemented wirelessly, for example, using a wide area network, such as the Internet, a Long Term Evolution (LTE) network, a Global System for Mobile Communications (or Groupe Special Mobile (GSM)) network, a Code Division Multiple Access (CDMA) network, an Evolution-Data Optimized (EV-DO) network, an Enhanced Data Rates for GSM Evolution (EDGE) network, a 3G network, a 4G network, a local area network, for example a Wi-Fi network, a personal area network, for example a Bluetooth™ network, and combinations or derivatives thereof. As illustrated in FIG. 1, (and explained below in more detail), the factory computer 106 provides the provisioning server 104 with information regarding the portable communication device while the provisioning server 104 exchanges information with the device management server 102 to configure the portable communication device. For example, the factory computer 106 transmits at least one of a unique identifier of the portable communication device 105 (one or more of which are received by the factory computer 106 directly from the portable communication device 105) and a certificate signing request to the provisioning server 104. The provisioning server 104 registers the portable communication device 105 with the device management server 102 using at least one unique identifier and transmits a signed certificate and an endpoint address to the factory computer 106. In should be understood, as described below in regard to FIGS. 4 and 6, that additional servers, networks, and devices may also communicate with the components of the system 100 over the communications network 110.

The device management server 102 manages information regarding the portable communication device 105. Such information includes, for example, one or more unique identifiers of the portable communication device 105. The at least one unique identifier may include a serial number of the portable communication device 105, an international mobile equipment identity (IMEI), and/or the like. A unique identifier may also be used to identify a specific part/component of the portable communication device 105. In some embodiments, the unique identifier is a part number of a component of the portable communication device 105. For example, the unique identifier may be an integrated circuit card identity (for example, a serial number or ICCID of a subscriber identity module or SIM).

As illustrated in FIG. 1, to provide the services described herein, the device management server 102 may communicate with the device management database 108. The database 108 may be a database housed on a suitable database server communicatively coupled to and accessible by the device management server 102. In alternative embodiments, the database 108 is part of a cloud-based database system external to the system 100 and accessible by the device management server 102 over one or more additional networks. Also, in some embodiments, all or part of the database 108 is locally stored on the device management server 102. In some embodiments, the database 108 electronically stores one or more profiles of a portable communication device, each profile including information regarding a particular portable communication device. It should be understood that, in some embodiments, the data stored in the database 108 is distributed among multiple databases that communicate with the device management server 102. For example, in some embodiments, the device management database 108 and the provisioning server database 109 may share information regarding each portable communication device.

Figure 2:
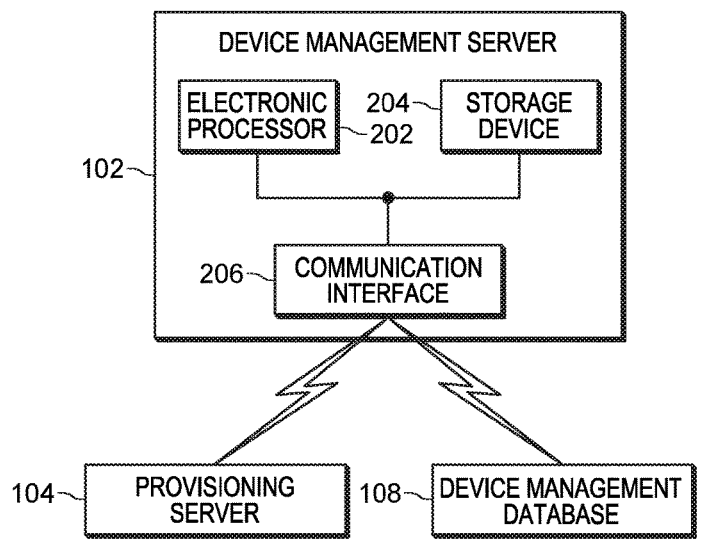
FIG. 2 schematically illustrates a server included in the system of FIG. 1 according to some embodiments.

FIG. 2 schematically illustrates the device management server 102 in more detail. As illustrated in FIG. 2, the device management server 102 includes an electronic processor 202, (for example, a microprocessor, application-specific integrated circuit (ASIC), or another suitable electronic device), a storage device 204 (for example, a non-transitory, computer-readable storage medium), and a communication interface 206, such as a transceiver, for communicating over the communications network 110 and, optionally, one or more additional communication networks or connections.

The storage device 204 may include a program storage area and a data storage area. The processor 202 is connected to the storage device 204 and executes computer readable code ("software") stored in a random access memory (RAM) of the memory (e.g., during execution), a read only memory (ROM) of the memory (e.g., on a generally permanent basis), or another non-transitory computer readable medium. Software included for the processes and methods for identification and initial configuration of each portable communication device can be stored in the storage device 204. The software may include firmware, one or more applications, program data, filters, rules, one or more program modules, and/or other executable instructions. The processor 202 is configured to retrieve from the storage device 204 and execute, among other things, instructions related to the processes and methods described herein. In some embodiments, some or all of the software and data stored in the storage device 204 may be stored in the device management database 108.

The electronic processor 202, the storage device 204, and the communication interface 206 included in the device management server 102 communicate wirelessly, over one or more communication lines or buses, or combination thereof. The electronic processor 202 is configured to retrieve from the storage device 204 and execute, among other things, software to perform the methods described herein. As described more particularly below, in some embodiments, the device management server 102 stores and exchanges information regarding one or more portable communication devices (for example, portable communication device 105) with the provisioning server 104, the portable communication device 105 (after the device management server is configured to communicate with the portable communication device 105 by the provisioning server 104), or to other computing devices (not shown). As described above, the provisioning server 104 and the factory computer 106 also include similar components as the device management server 102.

It should be understood that the device management server 102 may include additional components than those illustrated in FIG. 2 in various configurations and may perform additional functionality than the functionality described in the present application. Also, it should be understood that the functionality described herein as being performed by the device management server 102 may be distributed among multiple devices, such as multiple servers and may be provided through a cloud computing environment, accessible by components of the system 100 via the communications network 110. For example, in some embodiments, the storage device 204 is part of the device management database 108. In some embodiments, the device management server 102 may be part of a service network (explained below), for example an Internet of Things (IOT) service network. An IoT service network is a network of physical devices, vehicles, home appliances and other items embedded with electronics, software, sensors, actuators, and connectivity which enables these objects to connect and exchange data.

Returning to FIG. 1, the provisioning server 104 is a network-attached and accessible computer server that includes similar components as the device management server 102. As described in more detail below, the provisioning server 104 is configured to coordinate the configuration of the portable communication device 105 with one or more of a mobile virtual network operator (for example the mobile virtual network operator 404 of FIG. 4), the device management server 102, and, in some embodiments, one or more additional service networks (for example, the additional service networks 406 of FIG. 4).

A service network is a structure that includes one or more entities (such as other networks, servers, and devices) and is configured to provide one or more services or applications to end users and devices that are registered or activated with the service network. Such services may include cellular data, push-to-talk (PTT) communications, device management, and the like. In some embodiments, a service network includes an application programming interface (API) service. In some embodiments, the service provided by the service network may include, for example, a text messaging service, a multimedia messaging service, and/or a push to talk communication service.

The provisioning server 104 is also configured to store corresponding device configuration and provisioning information in the device management server 102 and provide any additional services for onboarding and/or fulfilling the portable communication device 105.

Figure 4:
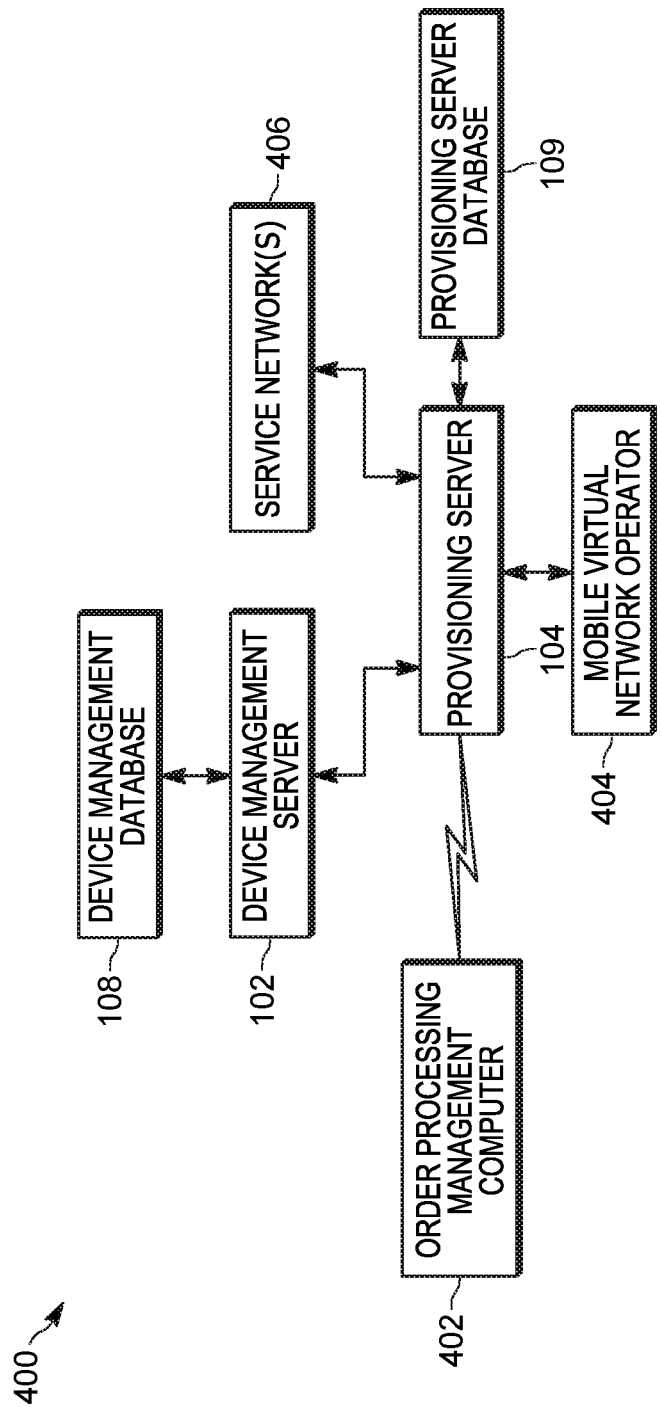
FIG. 4 is a block diagram of a system for fulfilling a customer order for a desired quantity of a portable communication device in accordance with some embodiments.
Figure 6:
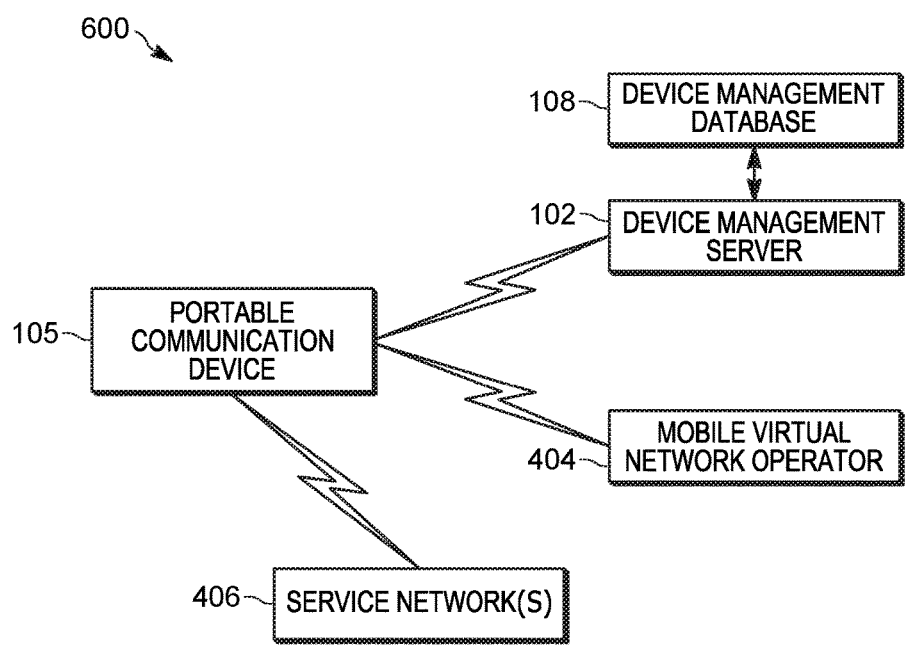
FIG. 6 is a block diagram of a system for registering a portable communication device with a service network in accordance with some embodiments.
Figure 7:
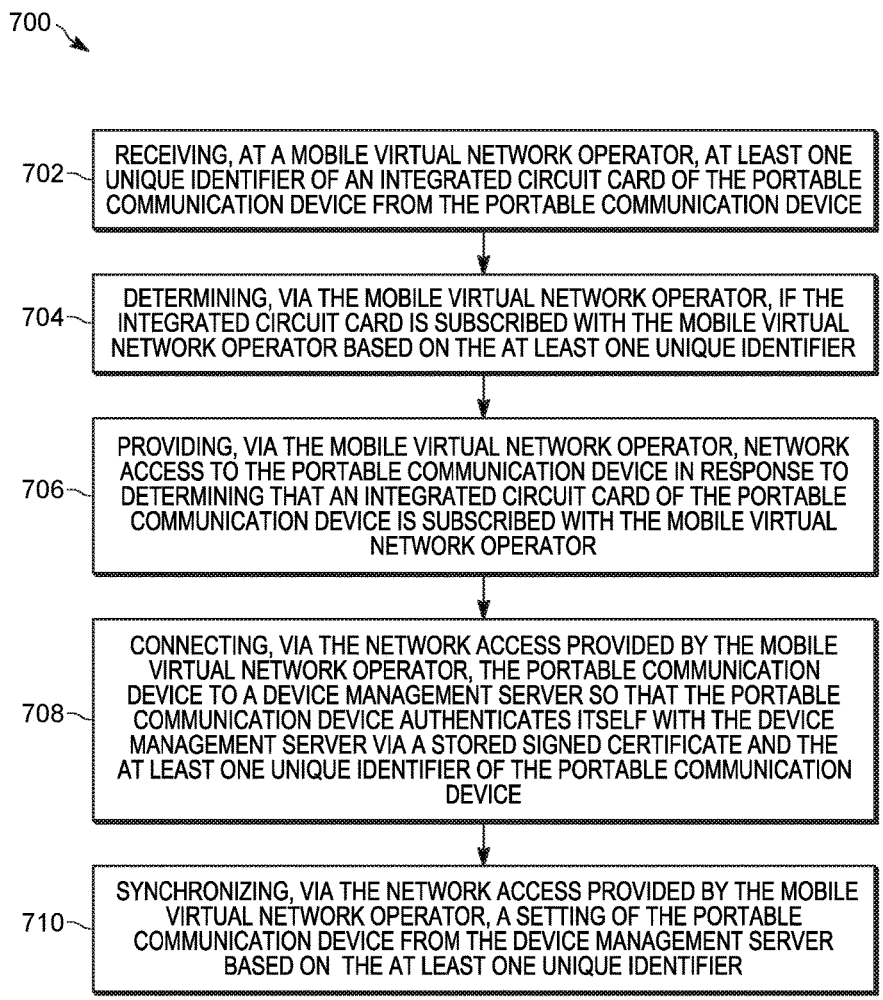
FIG. 7 is a flowchart of a method for registering a portable communication device with a service network implemented by the system of FIG. 6 in accordance with some embodiments.

Initially, as illustrated in FIGS. 1 and 4, the provisioning server 104 configures the device management server 102 and the portable communication device 105 to communicate directly with each other before the portable communication device 105 is received by a client/customer (shown in FIGS. 6 and 7). The provisioning server 104 may be configured to generate and store (for example, on the provisioning server database 109) a network profile for one or more portable communication devices. Each profile may include subscription information for a service network associated with a mobile virtual network operator (for example, the mobile virtual network operator 404 of FIG. 4). Each profile may also include credentials, parameters, and settings that the particular portable communications device uses to establish a connection with one or more service networks. For example, the subscription profile may include a shared symmetric key unique to the particular portable communication device and a particular wireless communications network, a public land mobile network identification (PLMN) ID, an access point name (APN), an international subscriber module identity (IMSI), a shared symmetric key, and operator authentication keys (OPc). The profile may also include temporary user certificates or temporary identity tokens that allow the particular portable communication device 105 to access the services provided by the particular service network.

As described in more detail below, the provisioning server 104 may further communicate the subscription information (for example, the portable communication device 105) within a profile to a mobile virtual network operator (for example, the mobile virtual network operator 404 of FIG. 4). The subscription information is used by the mobile virtual network operator to authenticate the identity of the portable communication device 105 before providing the device access to a service network managed by the mobile virtual network operator.

In some embodiments, the provisioning server 104 communicates with the provisioning server database 109. The provisioning server database 109 is a database that includes similar components as the device management database 108 and includes information related to operations support system/business support system services, for example onboarding and/or fulfillment of the portable communication device 105. Such information may include, but is not limited to, root authority certificates and endpoint addresses of the portable communication device 105.

The factory computer 106 is a network-attached and accessible computer that also includes similar components as the device management server 102. The factory computer 106 is part of a back-end manufacturing supplier system (not shown). The system and computer 106 are configured to handle the manufacturing and initial registration of the portable communication device 105. As described in more detail below, the initial configuration of the portable communication device 105 (performed at the manufacturing facility of the portable communication device 105) includes loading a client certificate, endpoint address, and related information onto the portable communication device 105.

Each portable communication device may be, for example, a radio, a smart phone, a converged device (for example, a LTE and LMR converged device), tablet, personal digital assistant (PDA), or other device that includes or can be connected to a network modem or components to enable wireless network communications (such as a baseband processor, memory, amplifier, antenna, and the like). Each portable communication device includes software stored therein for execution by the processor, and a non-volatile memory or other memory location for storing a subscription profile (that is, authentication data and network profile data). The non-volatile memory may be located on an integrated circuit card or universal integrated circuit card (UICC) in the portable communication device. In some embodiments, the portable communication device includes a wired communications module (for example, Ethernet or USB), via which the processor is operable to communicate. As explained in more detail below, each portable communication device includes an integrated circuit card for communicating wirelessly over one or more wireless networks.

As described in more detail below, the device management server 102 are capable of accessing and modifying data on the non-volatile memory of the portable communication device after the integrated circuit card of the portable communication device is registered (and/or the identity of the portable communication device) is verified/authenticated with the device management server 102). In some embodiments, the device management server 102 and/or the provisioning server 104 may be part of a backend as a service (BAAS) network. A BAAS system is a cloud computing service model that serves as the middleware that provides methods to connect networks and mobile applications to cloud services via API's and software developers' kits (SDK). Such services may include cloud storage, push notifications, server code, user and file management, social networking integration, location services, and user management and the like. In further embodiments, the device management server 102 and the provisioning server 104 may be part of the same network.

Figure 3:
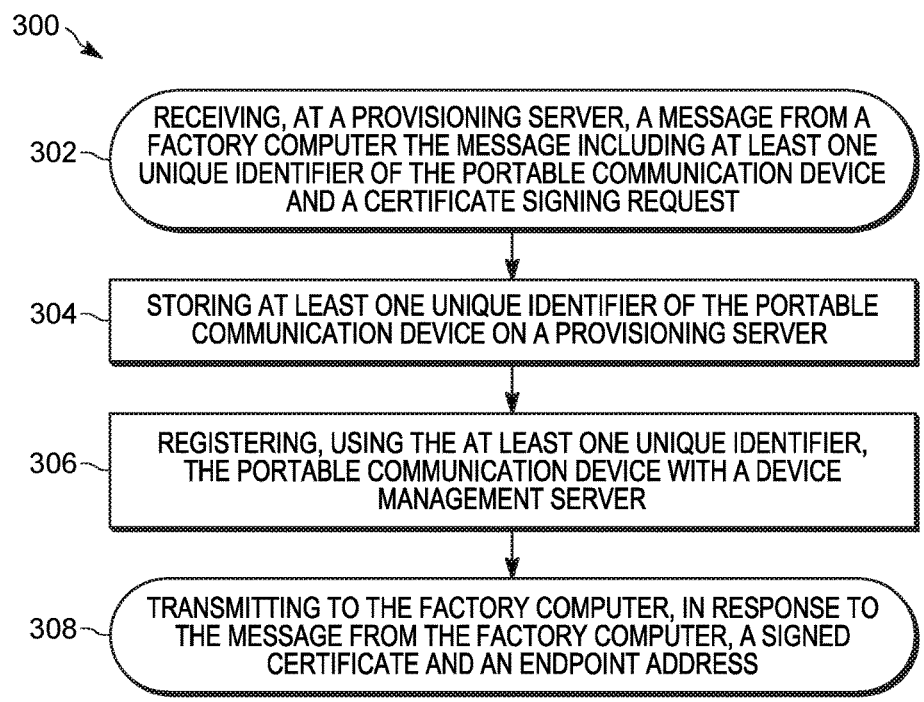
FIG. 3 is a flowchart of a method for preparing a portable communication device for onboarding to a service network implemented by the system of FIG. 1 in accordance with some embodiments.

FIG. 3 illustrates a method 300 for preparing a portable communication device (for example, the portable communication device 105) for onboarding to a service network performed by the system 100. Using method 300, a factory operator is able to onboard the portable communication device 105, for example a converged LTE device, for a service network before the portable communication device 105 leaves the manufacturing facility. Although the method 300 is described in terms of a single portable communication device 105, the method 300 may be simultaneously implemented on more than one portable communication device.

At block 302, the factory computer 106 transmits a message including at least one unique identifier of the portable communication device 105 and a certificate signing request to the provisioning server 104. As explained above, the unique identifier (or identifiers) may be/include a serial number of the portable communication device 105, an international mobile equipment identity, and an integrated circuit card identity.

At block 304, the provisioning server 104 stores the at least one unique identifier and, at block 306, registers the portable communication device 105 with the device management server 102 using the at least one unique identifier. In other words, the provisioning server 104 transmits the at least one unique identifier of the portable communication device 105 to the device management server 102 and the device management server 102 creates and stores (for example, on the database 108) a profile corresponding to the particular portable communication device 105 using the at least one unique identifier.

At block 308, the provisioning server 104 transmits, in response to the message from the factory computer 106, a signed certificate and an endpoint address for the portable communication device 105. The factory computer 106 then loads the signed certificate and endpoint address onto the portable communication device 105. As explained in more detail below, the signed certificate and/or the endpoint address (as well as any other additional related configuration information received from the provisioning server 104) may later be used by the portable communication device 105 to establish a communication link with the service network provided by the mobile virtual network operator (operator 404 of FIG. 4) and to establish a communication link with the device management server 102 and/or another service network. The endpoint address may include a uniform resource locator (url) including at least one unique identifier of the device. The factory computer 106 may load the signed certificate and endpoint address onto the portable communication device 105, for example, via a wired connection. Loading the information onto the portable communication device 105 via a wired connection may prevent the information from being intercepted by another device.

Once the method 300 is complete, the portable communication device 105 is ready to be transported to a distribution center. In some embodiments, the system 100 further includes a labeler configured to generate a package label to be included with the portable communication device 105 before the device 105 is transported to the distribution center. As explained in more detail below, at the distribution center, the portable communication device 105 is prepared to be redistributed to a third party entity. The package label includes the at least one unique identifier of the portable communication device 105. For example, in some embodiments, the package label includes a barcode indicative of the at least one unique identifier.

FIG. 4 illustrates is a block diagram of a system 400 for fulfilling one or more of the portable communication device for a customer order at a distribution center, the customer order including a request for a desired quantity of portable communication devices in accordance with some embodiments. The system 400 includes the device management server 102, the provisioning server 104, and an order processing management computer 402. In the illustrated embodiment, the system 400 further includes a mobile virtual network operator 404. It should be understood that the system 400 is provided as an example and, in some embodiments, the system 400 may include additional components. For example, the system 400 may include one or more databases including the device management database 108 and the provisioning server database 109. The system 400 also includes, in further embodiments, multiple device management servers 102, provisioning servers 104, multiple order processing management computers 402, multiple mobile virtual network operators 404, multiple databases, or combinations thereof. Additionally, it should be understood that, although the portable communication device 105 is not illustrated in the system 400, that the portable communication device 105 may be part of the "one or more portable communication devices associated with the customer order."

In the illustrated embodiment, the order processing management computer 402 is configured to communicate with the provisioning server 104. The provisioning server 104 is configured to communicate with the device management server 102 and the mobile virtual network operator 404. As illustrated in FIG. 4 (and explained below in more detail), the order processing management computer 402 communicates information regarding the customer order (including at least one of a unique identifier of one or more of the portable communication device included within the order) to the provisioning server 104 and the provisioning server 104 registers (or activates) the one or more of the portable communication device with the mobile virtual network operator 404 using the information including the at least one unique identifier of the portable communication device received from the order processing management computer 402. The provisioning server 104 may also be configured to register the one or more portable communication devices with the device management server 102 by providing information including the at least one unique identifier) to the device management server 102. In some embodiments, the provisioning server 104 may be further configured to register the one or more portable communication device with one or more service networks 406. Such service networks may include API service networks (for instance, a core service network of iOS®). In some embodiments, the additional service networks may be based on the customer order (for example, services specified by the client/customer for one or more of the particular portable communication device).

The order processing management computer 402 is a network-attached and accessible computer that also includes similar components as the device management server 102 (shown in FIG. 2). The order processing management computer 402 is part of a distribution center system (not shown). The distribution center system and computer 402 are configured to handle the distribution and, as described in more detail below, partial configuration of the portable communication device(s) of the customer order such that the portable communication device(s) are able to communicate with the mobile virtual network operator 404, the device management server 404, and/or additional service networks 406 once the portable communication device(s) are operated for the first time after being received by the client/customer. As also described in more detail below, the partial configuration of the portable communication devices includes registering/activating each of the devices with a subscription to the mobile virtual network operator 404 onto each of the portable communication devices.

The mobile virtual network operator 404 manages one or more of a service network (in the illustrated embodiment, the mobile virtual network operator 404 manages a network service).

Figure 5:
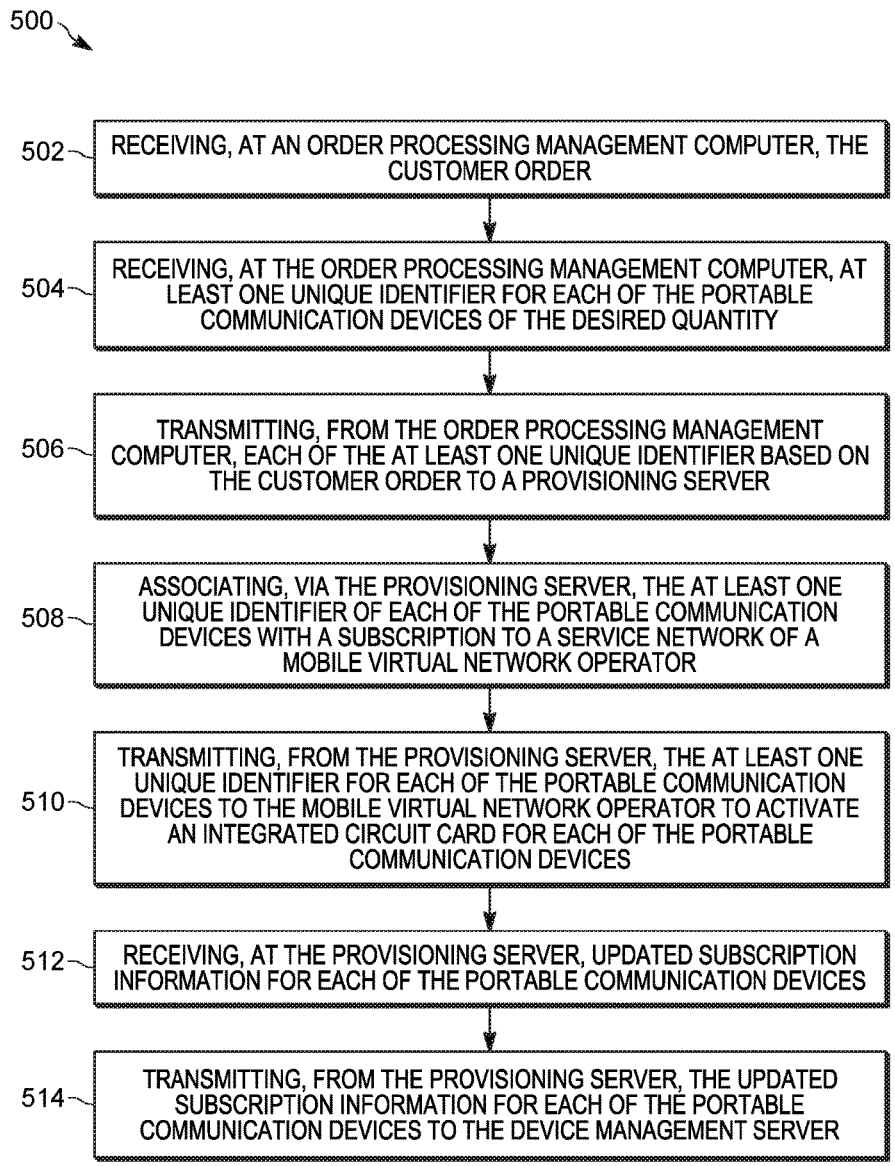
FIG. 5 is a flowchart of a method for fulfilling a customer order for a desired quantity of a portable communication device implemented by the system of FIG. 4 in accordance with some embodiments.

FIG. 5 illustrates a method 500 for fulfilling one or more of the portable communication device for a customer order implemented by the system 400. Using method 500, an operator of the order processing management computer 402 is able to configure one or more of the portable communication device, for example a converged LTE device, for a customer for a service network provided by the mobile virtual network operator 404 before the portable communication device (or devices) is/are received by the customer.

At block 502, the order processing management computer 402 receives the customer order. The customer order includes information regarding the customer as well as a desired quantity of portable communication devices. The customer order may be received directly from the client or through an intermediary party (for example, an e-commerce service).

At block 504, the order processing management computer 402 receives at least one unique identifier for each of the portable communication devices of the desired quantity. In other words, the unique identifier (or identifiers) of each of the portable communication devices selected from a stock of the distribution center to fulfill the customer order are entered (for example, via a barcode scanner) into the order processing management computer 402. In some embodiments, the at least one unique identifier is received by the order processing management computer 402 by using a scanner to retrieve the identifier(s) from a label on the device or on a package containing the portable communication device(s).

At block 506, the order processing management computer 402 transmits each of the at least one unique identifier associated with the customer order to the provisioning server 104. The provisioning server 104 associates the at least one unique identifier of each of the portable communication devices with a subscription to the service network of a mobile virtual network operator 404 (block 508). At block 510, the provisioning server 104 transmits, to the mobile virtual network operator 404, the at least one unique identifier for each of the portable communication devices to activate the integrated circuit card of each of the portable communication devices. At block 512, the provisioning server 104 receives, from the operator 404, updated subscription information for each of the portable communication devices, and, at block 514, the provisioning server 104 transmits the updated subscription information for each of the portable communication devices to the device management server 102.

In some embodiments, the method 500 includes further steps to register/associate one or more of the portable communication devices with a service account for a service provided by the one or more service networks 406. As described above, the service provided by the one or more service networks 406 may include, for example, a text messaging service, a multimedia messaging service, and/or a push to talk communication service. In some embodiments, one or more of the service networks 406 is provided by the mobile virtual network operator 404. In other embodiments, one or more of the service networks 406 are operated by a separate operator. One or more of the service networks 406 may be part of the same network as the device management server 102 and/or provisioning server 104. In such embodiments, the method 500 further includes associating, via the device management server 102, each of the portable communication devices associated with the customer order with a service account for the service and the device management server 102 receiving and storing an activation code for the service for each of the portable communication devices. In such embodiments, the provisioning server 104 may create the service account, manage the configuration and/or registration of each of the one or more portable communication devices, and store related configuration data on the device management server 102 such that the particular portable communication device is able to utilize the stored information to connect with the particular service network. As explained in more detail below, each of the portable communication device, upon accessing the service network for the first time, uses the activation code to activate/access the service. The activation code may include at least one selected from the group consisting of a username and password, a certificate, and a string of numbers and/or letters. It should be understood that the additional configuration steps performed outside the illustrated method 500 in FIG. 5 as well as those not described explicitly herein, vary depending on the particular portable communication device and the customer order. After the method 500 is performed, the one or more portable communication devices are shipped to the customer.

FIG. 6 illustrates is a block diagram of a system 600 registering a portable communication device with the service network in accordance with some embodiments. The system 600 includes the device management server 102, the mobile virtual network operator 404, and the portable communication device 105. The portable communication device 105 may be one of the portable communication devices received by the customer from the distribution center described above in regard to FIGS. 4 and 5.

It should be understood that the system 600 is provided as an example and, in some embodiments, the system 600 may include additional components, for example, the one or more service networks 406. For example, the system 600 may include one or more databases including the device management database 108 and the provisioning server database 109. The system 600 also includes, in further embodiments, multiple device management servers 102, provisioning servers 104, multiple order processing management computers 402, multiple mobile virtual network operators 404, multiple databases, or combinations thereof. It should also be understood that, although the system 600 and method 700 below are described in terms of a single portable communication device 105, that the system 600 and corresponding method 700 may include more than one portable communication device 105. It should also be understood that each of the portable communication devices may go through the process 700 concurrently.

The device management server 102 and the portable communication device 602 are communicatively coupled via the communications network 110. As described below, the system 600 is configured to configure one or more settings of the portable communication device 105 upon connecting the portable communication device 105 to the mobile virtual network operator 404 for the first time after being received by the customer/client.

FIG. 7 illustrates a method 700 implemented by the system 600 for registering a portable communication device with the service network provided by the mobile virtual network operator 404. The method 700 is performed when the one or more portable communication devices are received by the client.

At block 702, the mobile virtual network operator 404 receives, from the portable communication device 105, at least one unique identifier of the portable communication device 105. In the illustrated embodiment, the at least one unique identifier is used by the mobile virtual network operator 404 to identify the integrated circuit card of the portable communication device.

At block 704, the mobile virtual network operator 404 determines if the integrated circuit card is subscribed with the mobile virtual network operator 404 based on the at least one unique identifier. In other words, the mobile virtual network operator 404 verifies if the portable communication device 105 associated with the at least one unique identifier is associated with a subscription to the mobile virtual network operator 404.

At block 706, the mobile virtual network operator 404 provides network access to the portable communication device 105 in response to determining that the integrated circuit card of the portable communication device 105 is subscribed with the mobile virtual network operator 404. At block 708, the mobile virtual network operator 404 connects, via the network access provided by the mobile virtual network operator 404, the portable communication device 105 to the device management server 102 so that the portable communication device 105 authenticates itself with the device management server 102 via the stored signed certificate and the at least one unique identifier of the portable communication device 105. In some embodiments, the device management server 102 is part of the service network provided by the mobile virtual network operator 404. At block 710, the portable communication device 105 synchronizes, via the network access provided by the mobile virtual network operator 404, a setting of the portable communication device 105 from the device management server 102 based on the at least one unique identifier. A setting of the portable communication device 105 may be, for example, a privacy setting, an authority setting (for example, configuring certain functions of the portable communication device to be accessible and/or non-accessible), available applications, contact lists, and the like. In some embodiments, synchronizing a setting of the portable communication device 105 includes accessing configuration data previously stored on the device management server 102 by the provisioning server 104 so that the portable communication device 105 is able to establish a communication link with one or more of the service networks 406.

In some embodiments, the portable communication device 105, after authenticating itself with the device management server 102, downloads an activation code for a service provided by a service network (for example, a service network provided by one or more of the service networks 406), from the device management server 102, and, using the activation code, accesses the service provided by the service network(s) 406. In some embodiments, the portable communication device 105 downloads, via the network access provided by the mobile virtual network operator 404, a contact list and/or a talkgroup list and updates a contact list and/or talkgroup list stored on the portable communication device 105 based on the downloaded contact list and/or talkgroup list. A talkgroup contact list includes a plurality of talkgroup contacts. Each talkgroup contact is associated with a data record (for example, stored on a communication device or an external database accessible by the communication device) that stores contact information (for example, one or more talkgroup assignments) for a single entity (for example, an individual user or device) or a plurality of entities (for example, a group of individuals, such as a group of public safety personnel).

In some embodiments, the device management server 102 is configured to remove a profile of a particular portable communication device from the device management database 108 the device management server 102 is configured to send a notice to the mobile virtual network operator 404 to deny the particular portable communication device access to the service network when the profile of the particular portable communication device expires, upon receiving a command from an administrator of the system 100, 400, or 600, or upon receiving a command from a user of the particular portable communication device to remove the device from the service network. The device management server 102 may further be configured to remove profile of the particular portable communication device from the device management database 108. The device management server 102 may perform these functions wirelessly after the method 500 has been performed (after the integrated circuit card of the portable communication device has been registered). This allows an administrator of the system 100, 400, or 600 or a user of the portable communication device to remove the portable communication device from the service network. This may be desirable, for example, when the particular portable communication device is lost or stolen before reaching the client.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A system for preparing a portable communication device for onboarding to a service network, the system comprising:
   a provisioning server;
   a device management server; and
   a factory computer configured to call the provisioning server with a message that includes at least one unique identifier of the portable communication device and a client certificate signing request for the portable communication device, the factory computer being part of a back-end manufacturing supplier system;
   wherein the provisioning server is configured to
      store the at least one unique identifier,
      register, using the at least one unique identifier, the portable communication device with the device management server, and
      transmit, in response to the message from the factory computer, a signed client certificate of the portable communication device and an endpoint address to the factory computer.

2. The system of claim 1, wherein the at least one unique identifier is at least one selected from the group consisting of a serial number of the portable communication device, an international mobile equipment identity, and an integrated circuit card identity.

3. The system of claim 1, the system further comprising a labeler configured to generate a package label that includes the at least one unique identifier.

4. The system of claim 1, wherein the device management server is a part of an Internet of Things service network.

5. The system of claim 1, wherein the at least one selected from the group consisting of the provisioning server and the device management server is part of a backend as a service network.

6. A method for preparing a portable communication device for onboarding to a service network, the method comprising:
   receiving, at a provisioning server, a message from a factory computer the message including at least one unique identifier of the portable communication device and a certificate signing request for the portable communication device, the factory computer being part of a back-end manufacturing supplier system;
   storing, at the provisioning server, at least one unique identifier of the portable communication device;
   registering, via the provisioning server, the portable communication device with a device management server using the at least one unique identifier; and
   transmitting to the factory computer, from the provisioning server, in response to the message from the factory computer, a signed client certificate of the portable communication device and an endpoint address.

7. The method of claim 6, wherein the at least one unique identifier is at least one selected from the group consisting of a serial number of the portable communication device, an international mobile equipment identity, and an integrated circuit card identity.

8. The method of claim 6, the method further comprising generating, via a labeler, a package label that includes the at least one unique identifier.

9. The method of claim 6, wherein the device management server is part of an Internet of Things service network.

10. The method of claim 6, wherein the at least one selected from the group consisting of the provisioning server and the device management server is part of a backend as a service network.

\* \* \* \* \*